March 26, 1963 W. SWAROFSKY ETAL 3,082,672
PHOTOGRAPHIC CAMERA WITH INTERCHANGEABLE OBJECTIVES
Filed Sept. 30, 1960 3 Sheets-Sheet 1

INVENTORS
WALTER SWAROFSKY
FRITZ RENNEBERG
BY Blum, Moscovitz, Friedman
and Blum Attorneys INVENTORS
WALTER SWAROFSKY
FRITZ RENNEBERG
By Blum, Moscovitz, Friedman and Blum
Attorneys

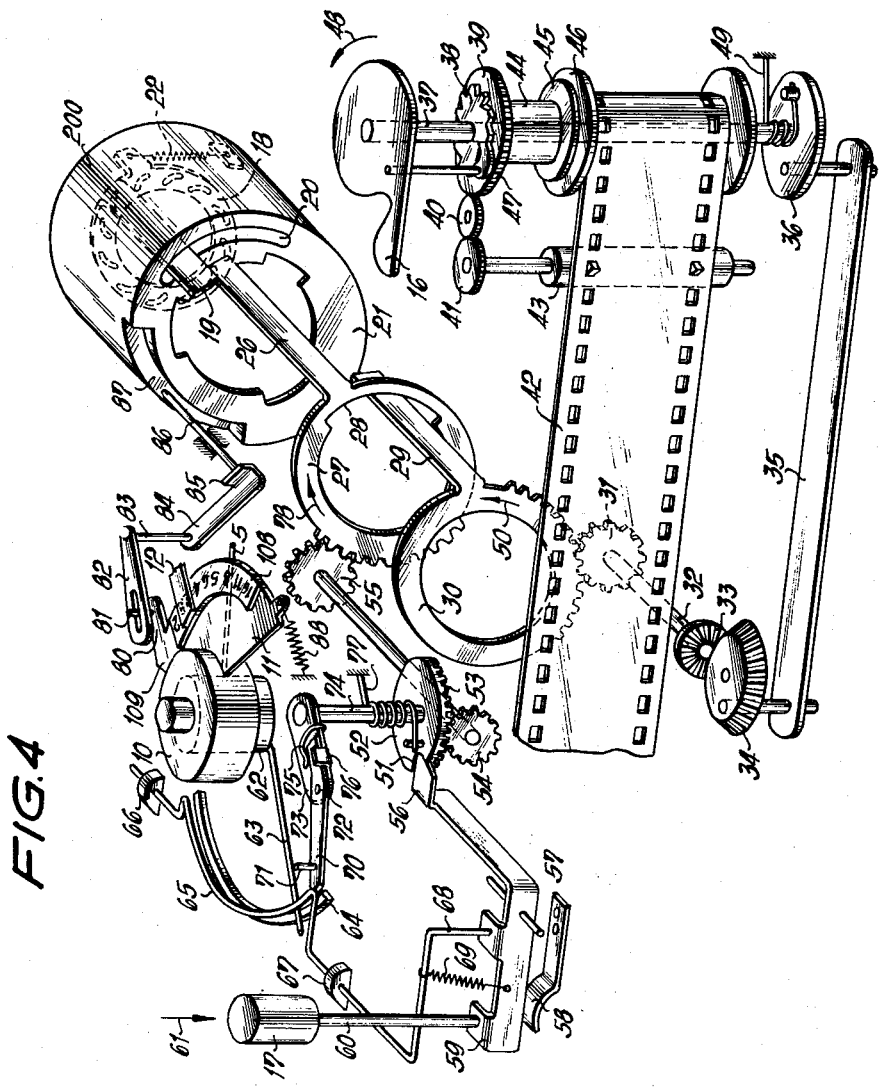

United States Patent Office
3,082,672
Patented Mar. 26, 1963

3,082,672
**PHOTOGRAPHIC CAMERA WITH INTER-
CHANGEABLE OBJECTIVES**
Walter Swarofsky and Fritz Renneberg, Braunschweig,
Germany, assignors to Voigtlander A.G., Braunschweig,
Germany, a corporation of Germany
Filed Sept. 30, 1960, Ser. No. 59,567
Claims priority, application Germany Oct. 30, 1959
15 Claims. (Cl. 95—10)

This invention relates to photographic cameras equipped with interchangeable objectives having different maximum relative apertures and provided with built-in diaphragms. More particularly, the invention relates to a photographic camera equipped with interchangeable objectives of this type wherein the diaphragm adjusting means of the objectives all have the same position, relative to the objective mounting means on the camera, at the maximum diaphragm aperture, and in which the respective diaphragm adjusting means are designed for operation by setting mechanisms in the camera, for adjustment of the diaphragm aperture from the maximum value to any selected aperture value.

In arrangements of this type wherein the diaphragm aperture is to be automatically adjusted in accordance with the indicating position of an exposure meter, additional mechanism is provided within the camera to couple the driving means or mechanism for the diaphragm adjusting means with a scanning means for the indicating position of the exposure meter. The built-in diaphragms of objectives having differing maximum relative apertures will have different diaphragm aperture settings when in the fully open position. Consequently, when the diaphragm adjusting means is thus coupled to the scanning mechanism as a result of mounting of an objective on the camera, and assuming the initial position of the scanning mechanism as corresponding to full diaphragm opening, the diaphragms of different objectives will have different relative aperture openings. For example, in the case of an objective having a maximum relative aperture of 1:2, the diaphragm thereof will be open fully to the value of "2"; in the case of another objective with a maximum relative aperture of 1:4, the diaphragm would be fully open to the value of "4"; and correspondingly in other cases.

Under identical exposure conditions as measured by the exposure meter, and resulting in identical deflections of the indicator of the exposure meter, the diaphragms of all objectives selectively coupled to the camera would be shifted by the same amount. Assuming, for example, that the exposure condition would normally result in a shift of three diaphragm steps away from maximum aperture, an objective having a maximum relative aperture of "2" would have its diaphragm aperture shifted to "5.6." On the other hand, with the same shift of three diaphragm steps applied to another objective having a maximum relative diaphragm opening of "4," the resultant three-step shift would adjust the diaphragm aperture of this objective to a value of "11." Consequently, for an equal deflection of the indicator of the exposure meter, resulting in an equal shift of the diaphragm adjusting means of objectives having different relative maximum apertures, the final setting would be completely different for each objective.

In accordance with the present invention, the camera is provided with additional means by which the controlling indicating and scanning components associated with the exposure meter can be pre-set to an initial position corresponding to the maximum relative aperture of any particular objective interchangeably mounted on the camera. More particularly, the casing and the indicating means of the exposure meter are adjustably mounted in the camera body in such a manner that they may be manually or automatically pre-set to an initial starting position corresponding to the maximum relative aperture of any particular objective interchangeably secured to the camera. In one case, cooperating pointer and scale means are provided in association with a knob for rotatably adjusting the entire casing of the exposure meter measuring instrument about its axis to a position corresponding to the maximum relative aperture of the objective secured to the camera. In a modification, a sensing means is operatively interposed between the exposure meter measuring instrument and keying or control means on the objective, and automatically pre-sets the measuring or indicating instrument to an initial position corresponding to the maximum relative aperture of the objective.

For an understanding of the principles of the invention, reference is made to the following description of typical embodiments thereof as illustrated in the accompanying drawings. In the drawings:

FIG. 4 is a view, similar to FIG. 3, illustrating a further embodiment of the invention.

Figure 1:
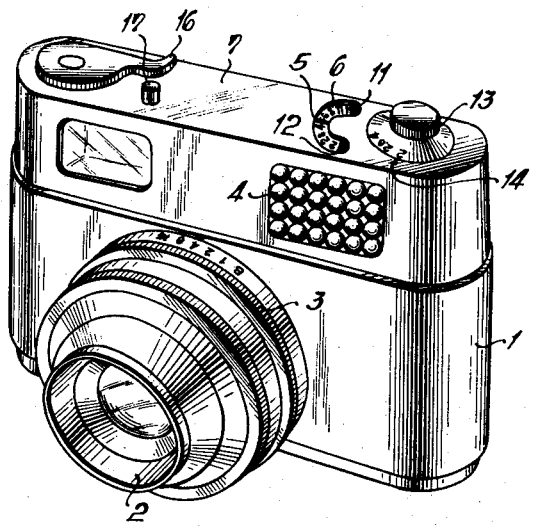
FIG. 1 is a perspective view of a photographic camera incorporating one embodiment of the present invention.
Figure 2:
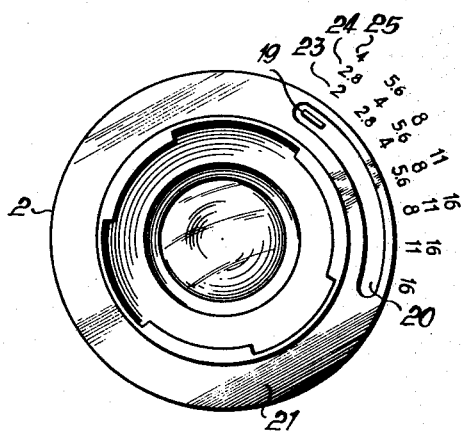
FIG. 2 is an elevational view of the camera engaging end of an interchangeable objective cooperable with the camera of FIG. 1.
Figure 3:
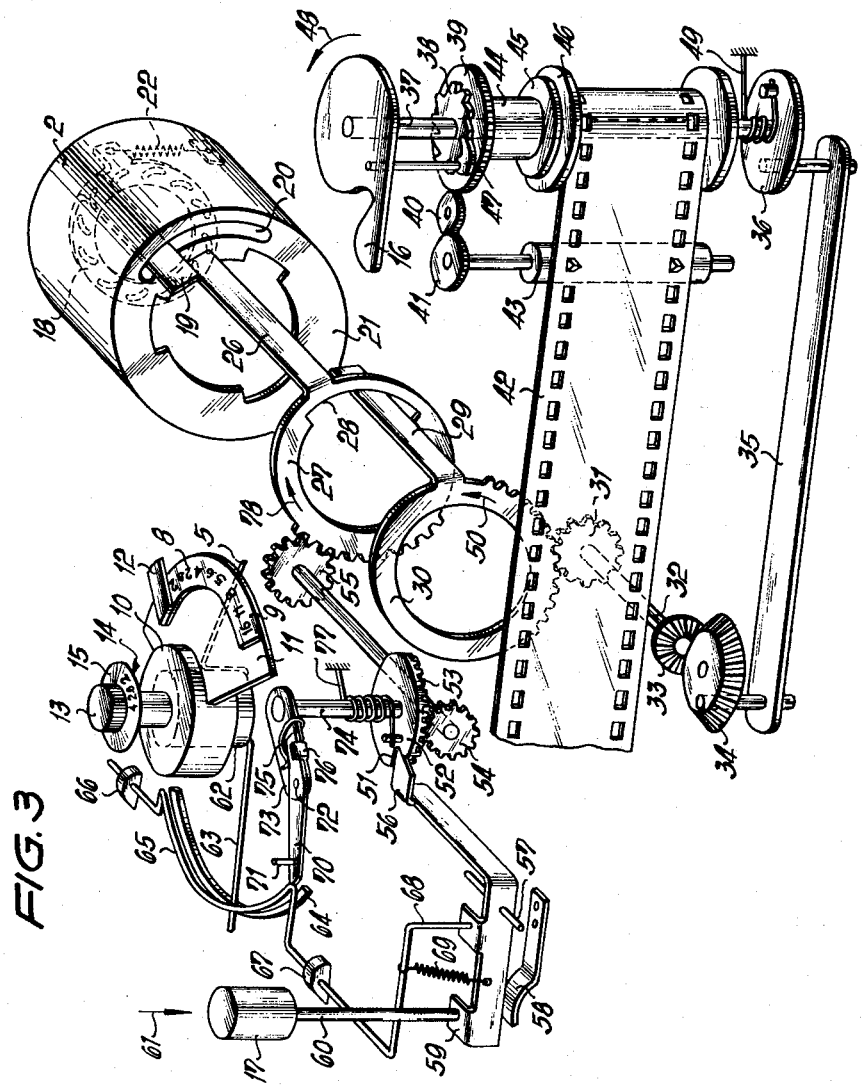
FIG. 3 is an exploded perspective view of the camera and interchangeable objective of FIGS. 1 and 2, with certain nonessential components thereof omitted.

Referring first to the embodiment of the invention illustrated in FIGS. 1, 2, and 3, a camera is illustrated as having a casing 1 arranged to have an objective 2 interchangeably secured thereto, as by a bayonet joint in a known manner. An iris diaphragm is incorporated in the objective 2 and is arranged to have its aperture opening adjusted by means mounted in the camera casing 1. The camera shutter, which may be an objective shutter or a slotted shutter, and which is connected with the camera casing 1, is provided with an exposure-time setting ring 3, and a known type of masking arrangement, such as an opaque disk, may be movable with ring 3 and cooperable with a photo-sensitive cell 4 of an electric exposure meter in such a manner that, depending upon the set position of the ring 3, more or less of the cell 4 is covered by the masking device. This arrangement varies the effective amplitude of movement of the measuring instrument, which may have linear deflection. The exposure meter indicator element 5 is visible through a window 6 in the camera hood or top 7, and is movable beneath a scale 8, as shown in FIG. 3.

Referring to FIG. 3, the scale 8 is imprinted or otherwise marked on a transparent support 9 which is rigidly connected with the housing 10 of the coil of the exposure meter measuring or indicating instrument. At one end, scale 8 is delimited by an opaque surface 11 of holder 9, this being the end of the scale indicating the smallest values of the diaphragm aperture. An opaque plate 12 is so mounted as to project into that area or portion of the scale 8 indicating the maximum diaphragm openings. This plate 12 is fixedly mounted separately from the scale carrier 9, such as by being mounted on the inner surface of the hood 7 of casing 1.

In accordance with the invention, housing 10 of the indicating instrument is rotatably mounted on the camera body 1 so that it may be rotatably adjusted about the axis of its indicating assembly by means of a knob 13 carrying a scale 15 cooperable with a reference mark 14 fixed on the camera hood. Scale 8 constitutes means indicating the maximum diaphragm apertures or maximum relative apertures of the interchangeable objectives intended for releasable engagement with the camera. The film feed lever is indicated at 16, and the shutter release key at 17.

Referring to FIG. 3, the blades of the iris diaphragm in objective 2 are adjusted in a conventional manner by means of a rotatable ring 18. A diaphragm operating component in the form of a relatively elongated tang or feeler bar or element 19 is secured to ring 18 and projects through an arcuate slot 20 in the camera engaging end 21 of the interchangeable objective 2. A spring 22, operatively associated with the ring 18, biases the ring to move the diaphragm blades in the direction of closing the diaphragm aperture.

The diaphragm setting mechanism, which is contained within the camera casing, is so designed that the diaphragm is held fully open while film is being fed and, upon actuation of the shutter release key, the diaphragm, which is normally locked in its open position, is released for the purpose of being set to a value corresponding to the reading of the exposure meter. The tang or feeler bars 19 of all of the objectives which may be used interchangeably with a particular camera are so mounted that, when the diaphragms of the objectives are fully open, the tangs 19 will have the same orientation or angular position with respect to the camera upon attachment of any objective to the camera.

Referring to FIG. 2, it will be noted that this figure illustrates how the fully open values of the diaphragm apertures differ with respect to different objectives, while the position of the tangs or feeler bars 19 of all the objectives is exactly the same. In this figure, the tang or feeler element 19 of an objective is shown in the position it has when the diaphragm of its associated objective is fully open. Alongside the objective there are indicated three series of aperture openings 23, 24, and 25, respectively corresponding to objectives having differing maximum relative apertures. The series of aperture openings idicated at 23 pertain to an objective 2 having an aperture ratio of 1:2 in the open position, and it will be noted that, in the open position shown in FIG. 2, the tang 19 is set to the value of "2." However, at the same position of the tang 19 is an objective having the ratio of 1:2.8, the tang 19 will be opposite the value "2.8" of scale 24. Likewise, in the case of an objective having a maximum relative aperture ratio of 1:4, the tang 19 in the fully open position illustrated in FIG. 2 will be opposite the value "4." Thus, if there is an adjustment of the tang 19 by the automatic mechanism contained in the camera casing, to the extent of three graduations of the series of diaphragm values in the respective scales 23, 24, and 25, then, in the case of the scale 23, the tang 19 would be adjusted to the value "5.6," in the case of the scale 24, the tang 19 would be adjusted to the value "8," and in the case of the scale 25, the tang 19 would be adjusted to the value "11."

In accordance with the present invention, the diaphragm opening setting means is so designed that, irrespective of the maximum relative aperture opening of an objective interchangeably secured to the camera casing, the adjusted diaphragm opening thereof, for a given reading of the exposure meter, will be identical for all objectives. As shown more particularly in FIG. 3, tang or feeler bar 19, extending from objective 2, is operatively associated with a diaphragm setting component in the form of a second tang or feeler element 26 extending from a ring 27 parallel to the axis of the latter, the ring 27 being mounted on the camera casing coaxially with the objective 2. As shown in FIGS. 2, 3, and 4, a bayonet type coupling is provided between the replaceable objective and the camera casing. As a result of the rotary motion imparted to the objective during its attachment to the camera by means of the bayonet type coupling, tangs 19 and 26 are brought into the relative position shown in FIG. 3.

The inner periphery of ring 27 is formed with an arcuate recess 28 in which is engaged a third tang or feeler bar or elements 29 extending from the periphery of a ring 30 and parallel to the axis of this ring. Ring 30 is formed with gear teeth around a portion of its external periphery, these teeth meshing with a pinion 31 secured to a shaft 32 having a bevel pinion 33 secured to its opposite end, and bevel pinion 33 meshes with the bevel gear 34 to which is eccentrically connected one end of a link 35. The opposite end of link 35 is eccentrically connected to a disk 36. Disk 36 is fixedly secured to one end of the shaft 37, and the film feed lever 16 is secured to the opposite end of this shaft. A ratchet 38 and a gear 39 are fixedly secured to each other and are rotatably mounted on the shaft 37. Gear 39 is drivingly connected with a film control roller 43 by means of a pinion 40 and a gear 41, the roller 43 having teeth engaging in the perforations of film 42. Gear 39 has a hub 44 on which is secured a friction disk 45 engageable with the pick-up spool 46 which is rotatably mounted on shaft 37. Thereby, the pick-up spool 46 is frictionally coupled to the gear 39. A pawl 47 is carried by the film feed lever 16 and cooperates with the ratchet 38 in such a manner as to rotate the ratchet 38 when the lever 16 is moved in the direction of the arrow 48. A torsion spring 49 engaged with disk 36 biases film feed lever 16 in the opposite direction.

Through the disk 36 and its described connections to the ring 30, oscillatory movement of film feed lever 16 is transmitted to ring 30 which, upon movement of the film feed lever in the direction of the arrow 48, is moved in the direction of the arrow 50. Rotation of ring 30 in the direction of the arrow 50 effects rotation of ring 27 through the medium of the third tang or feeler bar 29 engaged in the recess 28, and thereby the second tang or feeler bar 26, engaged with the first tang or feeler bar 19, moves the latter to the position of maximum diaphragm opening.

The ring 27 has gear teeth around a portion of its external periphery, and these teeth mesh with a pinion 55 secured to one end of a shaft having secured to its other end a pinion 54 meshing with a gear 52 having teeth 53 around the periphery of one face. Gear 52 has a notch in its periphery which, in the fully open position of the diaphragm, is engaged by the end 51 of a locking lever 56. Thereby, the ring 27 and tangs or feeler bars 26 and 19 are locked in the diaphragm open position irrespective of reverse movement of film feed lever under the influence of spring 49.

Locking lever 56 is pivoted on a shaft 57 and biased by a spring 58 in a direction to maintain its end 51 engaged in the notch of gear 53. Lever 56 has an angular abutment 59 which is positioned in the path of travel of an extension 60 of the shutter release key 17. When the shutter release key 17 is moved in the direction of the arrow 61, lever 56 is rocked to a position disengaging its end 51 from the notch in gear 52.

In addition to the exposure meter indicator element 5 movable relative to the scale 8, the measuring instrument having the housing 10 is provided with a second element or radial arm 63 secured to the rotor coil 62 and movable between a fixedly mounted clamping strip 64 and a movable clamping yoke 65. Yoke 65 is oscillatably mounted in stationary bearings 66 and 67, and a spring 69 biases an angular extension 68 of the yoke 65 into engagement with an abutment on the locking lever 56. The arrangement is such that the yoke 65 is normally spaced sufficiently from the clamping strip 64 to permit free movement of element 63. When shutter release key 17 is depressed in the direction of the arrow 61, the angular extension 68 of yoke 65 is moved downwardly so that the yoke 65 presses the element 63 firmly against the clamping surface or strip 64 to lock element 63, and thus movable coil 62, against movement. This locking of element 63 takes place before locking lever 56 releases gear 52. As spring 69 is connected between arm 68 and lever 56, further downward movement of key 17, resulting in further rocking of the locking lever 56, serves to maintain the radial element 63 even more firmly clamped between strip 64 and yoke 65.

A scanning element or lever 70 is movable along the inner periphery of the strip 64, travelling in a plane beneath the plane of travel of the radial element 63, and lever 70 carries a pin 71 engageable with the radial element 63. Lever 70 is pivotally mounted on a pin 72 secured to a radial arm or mounting plate 73 fixedly mounted on a shaft 74 to which is fixed the gear 52. A relatively weak spring 75 normally biases the inner end of lever 70 against a stop 76 on the arm 73.

Shaft 74 is coaxial with the shaft of rotor coil 62 of instrument 10, and the axis of this coil is likewise the axis about which the radial element 63 is swingable and is also the axis of the strip 64. Scanning lever 70 is so proportioned and mounted that, upon rotation of shaft 74, the outer end of lever 70 moves in closely adjacent but spaced relation to the inner surface of strip 64, which inner surface is perpendicular to the clamping surface of strip 64. When pin 71 engages the immovably locked exposure meter element 63, scanning lever 70 pivots a slight amount about bolt 72 against the influence of the relatively weak spring 75. This causes the front end of scanning lever 70 to abut against the adjacent face of clamping strip 64, whereby scanning lever 70 is wedged against the clamping strip. The two surfaces, that is the outer end of the scanning lever 70 and the inner peripheral surface of strip 64, are so designed as to augment this wedging of lever 70 against the strip 64.

As the shutter release key 17 is depressed, the locking lever 56 is swung to first effect the locking of element 63, as described, and thereafter to release the gear 52. A torsion spring 77, having one end secured to the gear 52 and the other end fixed, thereupon biases the shaft 74 to rotate in a direction to cause scanning lever 70 to engage element 63 with its pin 71, thus "scanning" the position of element 63. Simultaneously, and through the elements 52 through 55, ring 27 is rotated in the direction of arrow 78. Under the influence of spring 22, feeler bar 19 on diaphragm blade adjusting ring 18 follows the movement of feeler bar 26, so that the diaphragm is moved to a fixed open position corresponding to the position of element 63 and of exposure meter indicator element 5. Upon further depression of key 17, the shutter is actuated.

Even before exposure of the film due to actuation of the shutter, the camera user can note, from the position of indicator 5 along scale 8, what the diaphragm opening will be upon release of the shutter. When the indicator 5 cannot be seen, as when it is either concealed by plate 12 or opaque surface 11, it signifies that, under the prevailing light and exposure time set for the shutter release, there would be an incorrect exposure. By setting the exposure time adjusting ring 3 (FIG. 1) at a different value, it is possible to alter the value of the luminous flux incident on a photo-electric cell 4, thereby causing the indicator 5 to come within the visible area of the scale 8 and to give a diaphragm opening reading to which the diaphragm of the interchangeable objective can be set.

The objective 2 shown in FIG. 3 has a maximum relative aperture of 1:2. In the illustrated position of feeler bar or tang 19, the diaphragm is set at the value "2". The measuring instrument housing 10, which has been previously described as rotatably mounted, is shown as adjusted to a position wherein the value "2" of the scale 15 on knob 13 is positioned opposite the stationary mark 14, and thus the carrier 9 for the scale 8 is in a position wherein the scale values beginning with the value "2" can be seen. Knob 13 thus constitutes a device cooperable with the aperture indicating means 15 and operatively associated with exposure meter element 63 and scanning element 70, and operable to bodily adjust the measuring instrument housing 10. Before release of the shutter, the diaphragm will be automatically set at the value "5.6" shown by exposure meter indicator element 5, thus interlocking the three scale values.

When another objective replaces the objective 2, and if the other objective has a relative aperture of 1:4, its tang or feeler bar assumes, in its locked position, the same position as that of the objective 2 illustrated in FIG. 3. In this case, however, the fully open diaphragm corresponds to the value "4". If the other parts illustrated in FIG. 3 remain in unchanged position, the diaphragm is locked, prior to the shutter release, at a position corresponding to the scanning lever 70 and thus at the value "11". This will result in an underexposure since, in keeping with the reading of the exposure meter, the diaphragm value appropriate for the intended exposure should be "5.6".

To make possible the correct setting of the diaphragm opening, the measuring instrument 10 is mounted in a manner capable of displacement. It is set at any designated position by observation of scale 15 with reference to mark 14. For example, with an objective having an aperture ratio of 1:2, the set value would be "2", corresponding to the particular objective 2 of FIG. 2. Thus, as described in the foregoing, the diaphragm would be automatically set at a value of "5.6" corresponding to the reading of instrument 10.

If, by way of example, an objective having an aperture ratio of 1:4 is secured to the camera, it is necessary to accordingly adjust the measuring instrument 10 by means of the knob 13, and with reference to the scale 15 and mark 14, to the value "4", which corresponds to the maximum diaphragm aperture. If, now, the positions of the indicator element 5 and the element 63 remain unchanged, element 63 will be nearer the scanning lever 70 in the initial position of the latter. The amount of travel of scanning lever 70, and thus the amount of rotation of ring 27 and ring 18, is greatly reduced so that it is possible for the diaphragm of the interchangeable objective to be shifted by only a single scale value; that is, from the value of "4" to the value of "5.6" indicated by the measuring instrument.

When knob 13 is rotated, the scale carrier 9 is also rotated with reference to the stationary plate 12. Owing to the setting being at a value of "4", scale 8 is then visible at its portion commencing with the value "4", and the scale values "2" and "2.8" are obscured by the plate 12.

In the embodiment of the invention thus far described, the instrument 10 must be set manually in accordance with the maximum relative aperture of the particular objective fitted into the camera. FIG. 4 shows an arrangement whereby setting of the instrument 10 is effected automatically upon coupling of the objective to the camera.

Referring to FIG. 4, the arrangement shown therein differs from that of FIG. 3 only in the respects hereinafter mentioned. An arm 80 projects radially from the scale support plate 109, secured to the housing of measuring instrument 10, and carries a pin 81 engaged in an elongated slot in a lever arm 82. Lever arm 82 is fixedly secured to one end of a shaft 83, and a second lever arm 84, is secured to the other end of shaft 83. A tension spring 88 is secured between scale support plate or carrier 109 and a fixed point of the camera casing to normally bias the scale carrier 109 in a clockwise direction as viewed in FIG. 4. Lever arm 84 has, at its outer or free end, an abutment 85 disposed in the line of movement of an axially displaceable control pin 86. Pin 86 is slidably mounted in the camera casing in such manner that its outer end will engage a recess 87 in the inner end of an interchangeable objective 200 when the latter is coupled to the camera casing.

The recesses 86 of the interchangeable objectives differ, as to depth, in accordance with the relative maximum diaphragm aperture of each objective, whereby recesses 86 constitute means indicating the maximum diaphragm aperture of the objective disengageably coupled to the casing. Thus, upon coupling of an objective to the camera, the elements 86, 85, 84, 83, 82, 81, and 80 constitute a device cooperable with aperture indicating means 86 to adjust the housing of instrument 10 in accordance with the maximum relative aperture value of the particular objective coupled to the camera, thus automatically effecting the adjustment which is manually effected in the arrangement shown in FIG. 3. In the arrangement of FIG. 4, the knob 13 and scale 15 are eliminated. Spring 88, through the intermediate connections, maintains control pin 86 abutting the surface of recess 87. Other than these mentioned differences, the design and operation of the arrangement shown in FIG. 4 is identical to that shown in FIGS. 2 and 3.

In the particular example shown in FIG. 4, the objective 200 has an aperture ratio of 1:4. The depth of recess 87 is so selected that control pin 86, which scans the recess, sets the instrument 10 in a position corresponding to such aperture ratio. Thereby, the first portion of scale 108 visible to the user will have the diaphragm value "4", and the values "2.8" and "2" of scale 108 will be obscured by the element 12. It will be understood that, in place of the recesses 87, other equivalent means for contacting the pin 86 could be provided on its interchangeable objectives.

While specific embodiments of the invention have been shown and described in detail to illustrate the invention principles, it will be understood that the invention may be embodied otherwise without departing from such principles.

What is claimed is:

1. In a photographic camera including a casing and objectives constructed for interchangeable coupling to the casing and having different maximum relative apertures, each objective having incorporated therein a diaphragm and a diaphragm aperture adjusting means having an operating component interengageable with a diaphragm setting component forming part of diaphragm setting means incorporated in the casing, upon coupling of the objective to the casing, and the operating components of the respective objectives occupying identical maximum diaphragm aperture positions upon coupling of the respective objectives to the casing; the casing having an exposure meter incorporated therein and including an element movable through a pre-set range in accordance with incident light values, the diaphragm setting means including a scanning element movable from an initial position to scan the indicating position of the movable exposure meter element and coupled to the diaphragm setting component to adjust the diaphragm in accordance with the position of said scanning element; the improvement comprising means indicating the maximum diaphragm aperture of an objective disengageably coupled to said casing; and a device cooperable with said aperture indicating means and operatively associated with said exposure meter element and said scanning element and cooperable bodily to adjust one of said elements to shift said range relative to initial positions of said elements in accordance with the maximum relative aperture of a respective objective coupled to said casing.

2. The photographic camera defined in claim 1 in which the exposure meter includes a measuring instrument of which said element is a part; said measuring instrument being mounted in the casing for bodily adjustment; said device being connected to said measuring instrument to bodily adjust the latter.

3. The photographic camera defined in claim 2 in which said element swings about an axis of said measuring instrument; said measuring instrument being adjustable about said axis.

4. The photographic camera defined in claim 3 in which said device comprises a rotatably adjustable knob having an indicating scale, constituting said indicating means and calibrated in accordance with the maximum relative apertures of the interchangeable objectives, and cooperating with a fixed reference mark on the casing.

5. The photographic camera claimed in claim 2 in which said device includes a feeler element coupled to said measuring instrument and having an end engageable with a predetermined formation on each objective coupled to the casing; the predetermined formations on the respective objectives constituting said indicating means and respectively conforming to the maximum diaphragm aperture of the associated objective.

6. The photographic camera claimed in claim 3 in which said device includes a feeler element coupled to said measuring instrument and having an end engageable with a predetermined formation on each objective coupled to the casing; the predetermined formations on the respective objectives constituting said indicating means and respectively conforming to the maximum diaphragm aperture of the associated objective.

7. The photographic camera claimed in claim 5 in which said formations are recesses in the camera engaging surfaces of the respective objectives; the respective depths of the recesses conforming to the respective maximum diaphragm apertures of the associated objectives.

8. The photographic camera claimed in claim 6 in which said formations are recesses in the camera engaging surfaces of the respective objectives; the respective depths of the recesses conforming to the respective maximum diaphragm apertures of the associated objectives.

9. The photographic camera claimed in claim 8 in which said feeler element comprises an axially movable relatively elongated control pin having an end engageable in said recesses; spring means in the casing biasing said control pin to engage in said recesses; and a lever movably mounted in said casing and coupled to the measuring instrument, said lever being engageable with the other end of said control pin.

10. The photographic camera defined in claim 3 including a scale mounted on said measuring instrument, calibrated in diaphragm aperture openings, and coordinated with said element, said scale constituting said indicating means; and a masking device associated with one end of said scale and fixedly mounted in said casing.

11. The photographic camera defined in claim 10 including a hood for the casing having a window therein for said scale; said masking device comprising a plate visible through said window and forming a visual limit for the end of the scale at the indication of maximum diaphragm value.

12. The photographic camera defined in claim 11 wherein the edge of said window constitutes the visual limit for such one end of the diaphragm scale.

13. The photographic camera defined in claim 10 including an indicator element for said measuring instrument; one of said measuring instrument elements being movable relative to said scale and the other measuring instrument element being cooperable with said scanning element.

14. The photographic camera defined in claim 1 in which said diaphragm aperture adjusting means comprises a ring rotatable in the objective and connected to the blades of the diaphragm; said operating component comprising an elongated element connected to said ring and projecting from the camera engaging end of the objective; spring means associated with said adjusting ring and biasing the diaphragm to the closed position; said diaphragm setting component comprising an elongated element extending, parallel to the axis thereof, from a clamping ring rotatably mounted in the camera casing, and being interengageable with said operating component; said casing containing a film control drive and said clamping ring being coupled with said film control drive; said film control drive, upon forward feeding of the film, operating said clamping ring to rotate said adjusting ring through said operating component and said diaphragm setting component to fully open the diaphragm; said clamping ring being coupled to said scanning element and effective, upon rotation of the clamping ring by said film control mechanism, to move said scanning element to its initial position.

15. The photographic camera defined in claim 13 in which said other measuring instrument element is movable over an arcuate clamping surface concentric with its axis of rotation; an arcuate clamping member mounted for movement toward and away from said clamping surface to clamp said other measuring instrument element thereagainst, and being concentric with said clamping surface; said scanning element comprising an elongated lever pivotally mounted on the outer end of a radial arm on the end of a rotatable axle concentric with the axis of rotation of said other measuring instrument element; spring means normally biasing said lever against a stop on said radial arm and with said lever having its outer end substantially radial of said axle and spaced a very short distance from the arcuate inner periphery of said clamping surface; said lever having a pin mounted thereon engageable with said other measuring instrument element to swing said lever about its pivotal connection to the radial arm for wedging of the outer end of said lever against the arcuate inner edge of said clamping surface; said camera casing including a shutter release key operable, when actuated, to effect clamping of said other measuring instrument element between said clamping surface and said clamping member; and means operable by said shutter key, when the latter is actuated, to move said lever to follow said other measuring instrument element to engage the latter with its pin.

References Cited in the file of this patent
UNITED STATES PATENTS

| | | |
|---|---|---|
| 2,868,095 | Gebele | Jan. 13, 1959 |
| 2,889,761 | Gebele | June 9, 1959 |
| 2,924,162 | Rentschler | Feb. 9, 1960 |
| 2,929,308 | Swarofsky | Mar. 22, 1960 |
| 2,949,069 | Gebele | Aug. 16, 1960 |